Aug. 4, 1959   J. M. CLUWEN   2,898,537
ARRANGEMENT FOR STABILIZING THE SPEED OF A MOTOR
Filed July 12, 1954

INVENTOR
JOHANNES MEIJER CLUWEN
BY
AGENT

United States Patent Office 2,898,537
Patented Aug. 4, 1959

2,898,537

ARRANGEMENT FOR STABILIZING THE SPEED OF A MOTOR

Johannes Meijer Cluwen, Eindhoven, Netherlands, assignor, by mesne assignments, to North American Philips Company, Inc., New York, N.Y., a corporation of Delaware Application July 12, 1954, Serial No. 442,677

Claims priority, application Netherlands July 21, 1953

5 Claims. (Cl. 318—302)

The invention relates to an arrangement for stabilizing the speed of a motor.

In a known arrangement for stabilizing the speed of motors use is made of the centrifugal forces produced by the speed. In order to use these centrifugal forces with advantage these forces will have to be transmitted entirely or in part from a rotating part to a control arrangement. This requires a comparatively complicated, not particularly sensitive arrangement.

The object of the invention is to provide a construction which in comparison with the known construction operates more simply or more sensitively.

According to the invention the motor is at least loaded by a mechanical resonant system operated in the proximity of its resonant frequency, the load torque of which, which in the case of resonance strongly increases, has a stabilizing action upon the speed of the motor.

The invention is based on recognition of the fact that driving a mechanical resonant system in the proximity of its resonant frequency requires much energy as compared with driving this mechanical resonant system outside the range of its resonant frequency. Thus the load imposed on the motor will suddenly greatly increase when the resonant frequency of the mechanical resonant system is reached with the result that, if the motor is of the kind in which the speed is greatly reduced with increase in load, for example, an electric series motor, a stabilizing action upon the speed of the motor is obtainable. The choice of a mechanical resonant system having a given resonant frequency permits of stabilizing the desired speed of the motor in this manner.

Figure 1:
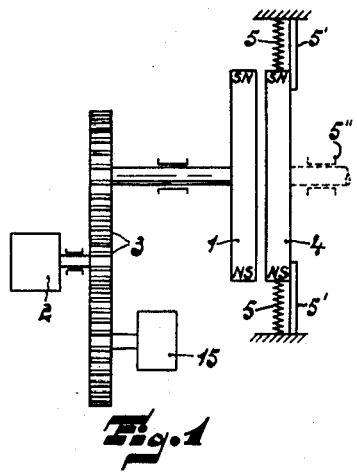
Figure 2:
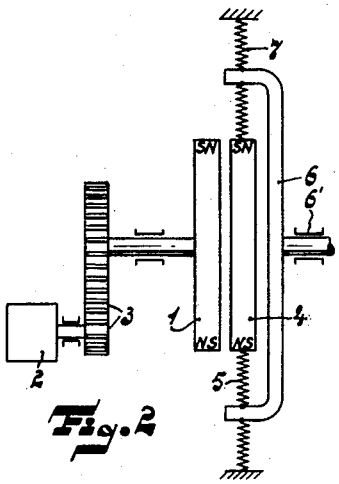
Figure 4:
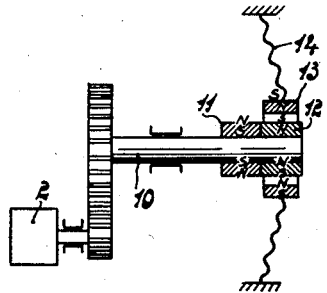
Figure 5:
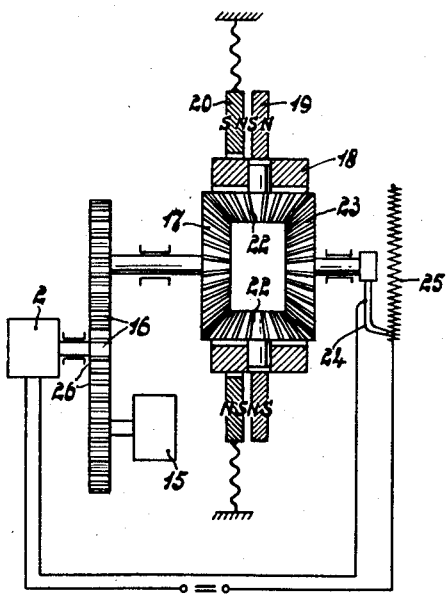
Figure 3:
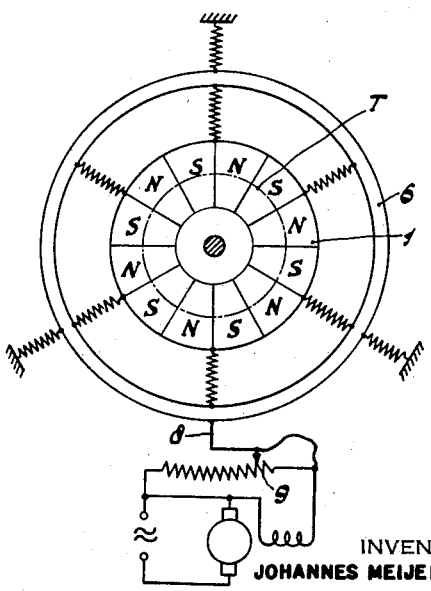

The invention will now be explained with reference to the accompanying drawing in which some embodiments thereof are shown by way of example, and in which Fig. 1 shows an arrangement according to the invention in which a motor has not only a useful load imposed on it but is also loaded by a mechanical resonant system operated in the proximity of its resonant frequency, Fig. 2 shows an arrangement of the kind shown in Fig. 1 in which a torque determined by the speed of the motor is produced, Fig. 3 is an elevation of a part which is not free to rotate, the load torque reacting upon a member controlling the speed of the motor, Fig. 4 shows a modification of an arrangement of the kind shown in Fig. 1, and Fig. 5 shows an embodiment in which the motor is coupled to the driven part of the resonant system through a differential gear.

The arrangement shown in Fig. 1 comprises a resonant system 1–4 consisting of a first part 1 which is driven by a motor 2, for example of the series type by means of a transmission 3, and a second part 4 which is suspended from springs 5 uniformly distributed along the circumference so as to be not free to rotate. The motor 2 is loaded not only by the resonant system 1–4 but also by a useful load 15. The part 5 may be suspended, for example, by means of plate springs 5' in a manner such that it can only move readily in axial directions. However, it is also possible for part 4 to be arranged such that it can only move readily in a tangential direction. The two parts 1 and 4 preferably consist of disc-shaped magnetic circuits made of permanent-magnetic material in which in the axial direction poles N and S are magnetized which measured along a pitch circle T (see Fig. 3) produce a magnetic field which alternately changes its direction. If part 1 of the resonant system is driven by the motor 2 attractive and repulsive forces will be alternately exerted on the part 4. If the speed of the motor 2 is increased, the system will be set into its resonance on a given speed being reached with the result that the load imposed on the motor by this system is at its lowest value. Due to this performance a stabilizing action upon the speed of the motor is obtained. The present construction operates similar to a synchronous device. Accordingly, the motor when overspeeding causes the poles of coupled member 1 to pass the poles of coupled vibrating member 4 above the resonant frequency resulting in the vibrating member applying torque in a manner to reduce the motor speed whereby the force of attraction and repulsion of the poles on both the coupled members draw power from the vibrating body in order to produce a physical counter force which reduces the overspeed of the motor and causes the other coupled member 4 to vibrate again at substantially its resonant frequency.

The choice of the resonant frequency of the system permits a desired speed of the motor to be stabilized. By changing the mechanical resonant frequency the speed of the motor can be stabilized at a different value. This arrangement can serve not only to drive the useful load 15 at a constant speed but also to produce a vibrating movement having a large deflection in which case the resonant system 1–4 consequently acts as the useful load.

In Fig. 2 the part 4 is resiliently suspended in a cover-shaped body 6 which is suspended from springs 7 so as to be not free to rotate in the tangential direction and is supported by a universal bearing 6' so as to be rigid in the axial direction. In accordance with the torque transmitted by the part 1 to the part 4 the cover-shaped body 6 will exhibit a deflection in the tangential direction until the springs 7 produce a back torque which is equal the torque transmitted by the part 1 to the part 4. Fig. 3 shows diagrammatically how the value of this torque can also be used to stabilize the speed of the motor indirectly. For this purpose the cover-shaped body 6 has an arm 8 secured to it which is connected to that part of a rheostat 9 included in the supply lead of the motor 2 which is adapted to be moved. As long as the vibrating system is not operated in the proximity of its resonant frequency the transmitted torque will be small and substantially constant. However, when the vibrating system is operated in the proximity of its resonant frequency, the transmitted torque suddenly and rapidly increases. Consequently, if in Fig. 3 the system is driven in the proximity of its mechanical resonant frequency, a variation of the speed of the motor will result in a sudden large variation of the position of the arm 8 and consequently of the switch-on position of the rheostat 9, so that variations of the speed of the motor are again counteracted by means of an additional electrical assist.

Obviously the arm 8 which is adapted to be moved may also in a similar manner exert a stabilizing reaction upon, for example, the fuel supply of a combustion engine.

Fig. 4 shows a modification of an arrangement of the kind shown in Fig. 1 in which the driven shaft 10 carries cylindrical radially magnetized circuits 11 and 12. The second part of the mechanical resonant system in this case also consists of a cylindrical radially magnetized circuit 13. The circuit 13 is suspended from a corrugated annular sheet 14 which is resilient in the axial direction and rigid in the tangential direction. When the shaft 10 revolves the circuit 13 will be moved alternately to the left and to the right due to the alternating polarity of the circuits 11 and 12 and at a given speed of the shaft 10 will be set into its natural resonance with the result that the speed of the motor 2 is again stabilized.

In the arrangement shown in Fig. 5 the motor 2 is coupled through a toothed gearing 16 to a bevel wheel 17 of a differential gear, the cage 18 of which is connected to a first part 19 of a mechanical resonant system 19—20 which may be designed similarly to that shown in Fig. 1 or 4. In the cage 18 the planetary bevel wheels 22 are evenly distributed about the circumference of the cage 18 in which they are journalled so as to be rotary. The bevel wheel 23 co-operating with the planetary wheels 22 is connected to an arm 24 which is adapted to move relatively to a control resistor 25 included in the supply lead of the motor 2. In addition the motor 2 drives the normal load 15, for example, via the toothed gearing 26.

If the bevel wheel 17 is driven at a speed $n_1$ the cage 18 will assume a speed N which is determined by the mechanical resonant frequency of the vibrating system comprising the parts 19 and 20. The remainder of the speed $n_2 = 2N - n_1$ is transmitted to the arm 24 via the bevel wheel 23. However, each movement of this arm 24 via the control resistor 25 reacts in a stabilizing manner upon the speed of the motor 2 and consequently $n_2$ is kept at the value zero and $n_1$ at the value 2N. Thus, an arrangement is obtained in which the speed control is very sensitive. If instead of a differential gear comprising bevel wheels a differential gear comprising spur wheels should be used, $n_1$ will be stabilized at a value $a.N$ where $a$ may be either of 2 different constants. The mass connected to the arm 24 must be large enough for instabilities of the control to be prevented in the case of rapid speed variations. The load torque caused by the arm 24 should preferably be such that the resonant system 19—20 is operated at ½ to ¾ of its maximum load torque in which event the most sensitive control least affected by disturbances is obtainable.

The magnetic circuits shown are preferably made from a material in which the ratio between the retentivity $B_r$ in Gauss and the coercitivity $_BH_C$ in Oersted is less than 4, for example of the kind described in U.S. Patent No. 2,762,777 to J. J. Went et al., issued September 11, 1956, U.S. Patent No. 2,762,778 to E. W. Gerter et al., issued September 11, 1956, and U. S. Patent No. 2,722,617 to J. M. Cluwen issued November 1, 1955 in which the dimensions are preferably arranged in accordance with U.S. Patent No. 2,722,617.

In principle the invention might be used not only with magnetic circuits but also with resonant systems of a different kind, for example, based on resiliently arranged masses being set into vibration by mechanical means.

What is claimed:

1. A mechanism for stabilizing the speed of a motor comprising a mechanical resonant system having at least two co-axial spaced but magnetically coupled members therein, said members having a plurality of north and south poles in an alternate substantially circular arrangement and being magnetized in their axial direction, means operatively connecting one of said members to said motor, the other coupled member being consequently vibrated at substantially its resonant frequency, and means mounting said vibrating body for preventing rotational movement thereof with said one coupled member, said motor when overspeeding causing the poles of said one coupled member to pass the poles of the other coupled member above the resonant frequency resulting in the vibrating member applying torque in a manner to reduce the motor speed whereby the force of attraction and repulsion of said poles on both said coupled members draw power from said vibrating body in order to produce a physical counter force which reduces the over-speed of the motor and causes said other coupled member to vibrate again at substantially its resonant frequency.

2. A mechanism for stabilizing the speed of a motor comprising a mechanical resonant system having at least two magnetically coupled members therein said members being disc-shaped bodies in co-axial alignment and spaced from one another, said magnetic bodies having a plurality of north and south poles in an alternate substantially circular arrangement and being magnetized in their axial directions, means operatively connecting one of said members to said motor, means resiliently mounting the other coupled member in said system and axially vibrated at substantially its resonant frequency, means mounting said vibrating body for preventing rotational movement thereof with said coupled rotatable members, said motor when overspeeding causing the poles of said one coupled member to pass the poles of the other coupled member above the resonant frequency resulting in the vibrating member applying torque in a manner to reduce the motor speed whereby the forces of attraction and repulsison of said poles on both said coupled members draw power from said motor in order to produce a physical counter force which reduces the over-speed of the motor and causes said other coupled members to vibrate again at substantially its resonant frequency.

3. A mechanism for stabilizing the speed of a motor as claimed in claim 2 in which the magnetic bodies are constituted of permanent magnetic material having a retentivity $B_r$ in Gauss which is less than one-fourth of the coercitivity $_BH_C$ in Oersteds.

4. A mechanism for stabilizing the speed of a motor comprising a mechanical resonant system having at least two co-axial spaced but magnetically coupled members therein, said members having a plurality of north and south poles in an alternate substantially circular arrangement and being magnetized in their axial direction, means operatively connecting one of said members to said motor, the other coupled member being consequently vibrated at substantially its resonant frequency, and means mounting the vibrating body to permit limited rotation of said body, said motor when overspeeding causing the poles of said one coupled member to pass the poles of the other coupled member above the resonant frequency resulting in the vibrating member applying torque in a manner to reduce the motor speed whereby the force of attraction and repulsion of said poles on both said coupled members draw power from said vibrating body in order to produce a physical counter force which reduces the over-speed of the motor and causes said other coupled member to vibrate again at substantially its resonant frequency, a control member, and a motor circuit including a rheostat governing the output speed of said motor being operatively connected with said rheostat and said control member and the vibrating member of said resonant system, said control member being displaceable by the movement of the vibrating member for stabilizing the speed of the motor.

5. A mechanism for stabilizing the speed of a motor comprising a mechanical resonant system having at least two magnetically coupled members therein, said members being disc-shaped bodies in co-axial alignment and spaced from one another, said magnetic bodies having a plurality of north and south poles in an alternate, substantially circular arrangement and being magnetized in their radial directions, means operatively connecting one of said members to said motor, means resiliently mounting the other coupled member in said system and axially vibrated at substantially its resonant frequency, said resiliently mounted coupled member vibrating relatively to said other coupled member in the axial direction thereof, means mounting said vibrating body for preventing rotational movement thereof with said coupled rotatable members, said motor when overspeeding causing the poles of said one coupled member to pass the poles of the other coupled member above the resonant frequency resulting in the vibrating member applying torque in a manner to reduce the motor speed whereby the forces of attraction and repulsion of said poles on both said coupled members draw power from said motor in order to produce a physical counter force which reduces the over-speed of the motor and causes said other coupled members to vibrate again at substantially its resonant frequency.

References Cited in the file of this patent

UNITED STATES PATENTS

| | | |
|---|---|---|
| 2,526,373 | Le Clair | Oct. 17, 1950 |
| 2,539,540 | Idar et al. | Jan. 30, 1951 |